United States Patent [19]

Hunter et al.

[11] Patent Number: 5,493,468
[45] Date of Patent: Feb. 20, 1996

[54] ELECTRICAL CONTACTOR SYSTEM WITH TRANSFER OF SCALED OVERLOAD INFORMATION

[75] Inventors: Patrick J. Hunter, Asheville, N.C.; Robert T. Elms, Monroeville Boro, Allegheny County; Gary F. Saletta, Penn Township, Westmoreland County, both of Pa.; Denis A. Mueller, Asheville, N.C.

[73] Assignee: Eaton Corporation, Cleveland, Ohio

[21] Appl. No.: 129,819

[22] Filed: Sep. 30, 1993

Related U.S. Application Data

[63] Continuation-in-part of Ser. No. 933,282, Aug. 21, 1992.
[51] Int. Cl.[6] ................................................... H02H 7/08
[52] U.S. Cl. ................................................ 361/31; 361/93
[58] Field of Search ........................... 361/23–31, 93–94, 361/95, 103, 82–83, 96–97; 318/603, 606, 712, 721, 807

[56] References Cited

U.S. PATENT DOCUMENTS

| | | | |
|---|---|---|---|
| 4,616,324 | 10/1986 | Simmel | 364/31 |
| 4,631,625 | 12/1986 | Alexander et al. | 361/94 |
| 4,695,961 | 9/1987 | Arinobu | 364/483 |
| 4,819,118 | 4/1989 | Mueller et al. | 361/25 |

FOREIGN PATENT DOCUMENTS

147595   4/1991   Germany.

*Primary Examiner*—A. D. Pellinen
*Assistant Examiner*—Michael J. Sherry
*Attorney, Agent, or Firm*—Martin J. Moran

[57] ABSTRACT

In a multiple contactor installation where each contactor provides overcurrent protection, overload information in passed from one active contactor to the next as a percentage of the trip level of the respective contactors.

3 Claims, 11 Drawing Sheets

ELECTRICAL CONTACTOR SYSTEM WITH TRANSFER OF SCALED OVERLOAD INFORMATION

CROSS REFERENCE TO RELATED APPLICATIONS

This application is a continuation-in-part of U.S. patent application Ser. No. 07/933,282 entitled "Digital Modular Microprocessor Based Electrical Contactor" filed on Aug. 21, 1992.

BACKGROUND OF THE INVENTION

1. Field of The Invention

This invention relates to multiple electrical contactor systems having a control module which transfers between contactors overload information scaled to the respective trip settings of the contactors.

2. Background Information

Contactors are switches which connect medium to large power consuming electrical loads, such as for instance, electric motors, to a commercial power system. When combined with overload protection for a motor, the device is referred to as motor starter. As used here in, the term "contactor" is intended to denote throughout power switches with overload protection for use with motors or other electrical loads.

In a number of applications, multiple contactors are operated in a coordinated manner to perform a desired task. For instance, forward and reverse contactors are used to control the direction of rotation of a 3-phase motor by selectively providing opposite phase rotations. In another application, two pairs of contactors are used to alternately connect a 3-phase motor in a Y configuration for start-up and low speed operation, and to switch to a delta configuration for high speed operation as the motor speeds up.

It has been the practice for certain reduced voltage starter systems to use a stand alone overload relay which monitors the current drawn by the active starter. U.S. Pat. No. 4,819,118 discloses a reversing motor control system which does not require a stand alone overload relay. Each of the contactors in this patent contains a microprocessor which provides overload protection by calculating a thermal profile. The active one of the forward and reverse contactors, referred to as the "talker", continuously supplies its calculated thermal profile to the non-active, "listener", contactor, so that upon reversal of the motor direction the former "listener" becomes active with the current thermal profile.

Commonly owned U.S. patent application Ser. No. 933,282 filed on Aug. 21, 1992 and entitled Digital Modular "Microprocessor Based Electrical Contactor System" discloses a multiple contactor system which incorporates a digital control module which communicates with the individual contactors through serial data links. When control is to be shifted from one contactor to another, the control module requests the current thermal profile from the contactor which has been active and transmits it to the contactor which is to become active.

In both of these current systems which transfer thermal profiles between contactors, the instant value of the thermal profile is transferred as is, without modification. However, in some applications, it is desirable to have different trip levels in the different contactors of a multiple contactor system. This is particularly true in a multi-speed contactor system and can also be true in a reversing contactor system.

There is a need there for an improved multi-contactor system which can transfer thermal overload information between contactors scaled to the requirements of the particular contactors.

SUMMARY OF THE INVENTION

This need and others are satisfied by the invention which is directed to a multiple contactor system which includes a controller for controlling the operation of the contactors and in particular which scales overload information transferred between contactors based on the trip levels of the sending and receiving contactors.

More specifically, the invention is directed to a contactor system for controlling energization of an electrical load which comprises:

first contactor means having a first current rating supplying energization to said electrical load when closed and having first processor means generating a first overcurrent tally as a function of current and time during which current supplied to said electrical load through said first contactor means exceeds said first current rating and tripping said first contactor open when said first overcurrent tally reaches a first trip value;

second contactor means having a second current rating supplying energization to said electrical load when closed and having second processor means generating a second overcurrent tally as a function of current and time during which current supplied to said electrical load through said second contactor means exceeds said second overcurrent tally and tripping said second contractor open when said second overcurrent tally reaches a second trip value; and controller means connected to said first and second processor means of said first and second contactor means controlling opening and closing of said first and second contactor means and having third processor means which, when one of the contactors means which has been closed is to be opened and the other contactor means which has been open is to be closed, calculates from the overcurrent tally from the one contactor which has been closed and the first and second trip values, and provides to the processor means of the other contactor means, an initial value for the overcurrent tally of the other contactor means when closed.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention is applicable to multiple contactor applications, and in particular to such applications in which at least two contactors have different current/time trip values. It will be described as applied to a reversing motor starter which utilizes a forward and a reverse contactor; however, it will be understood by those skilled in the art that the principles are applicable to other types of multiple contactor installations. In fact, the controller used in the exemplary contactor for the reversing motor controller can also control a two-speed motor control system in which two contactors selectively energize a low speed or a high speed winding in a synchronous motor.

Figure 1:
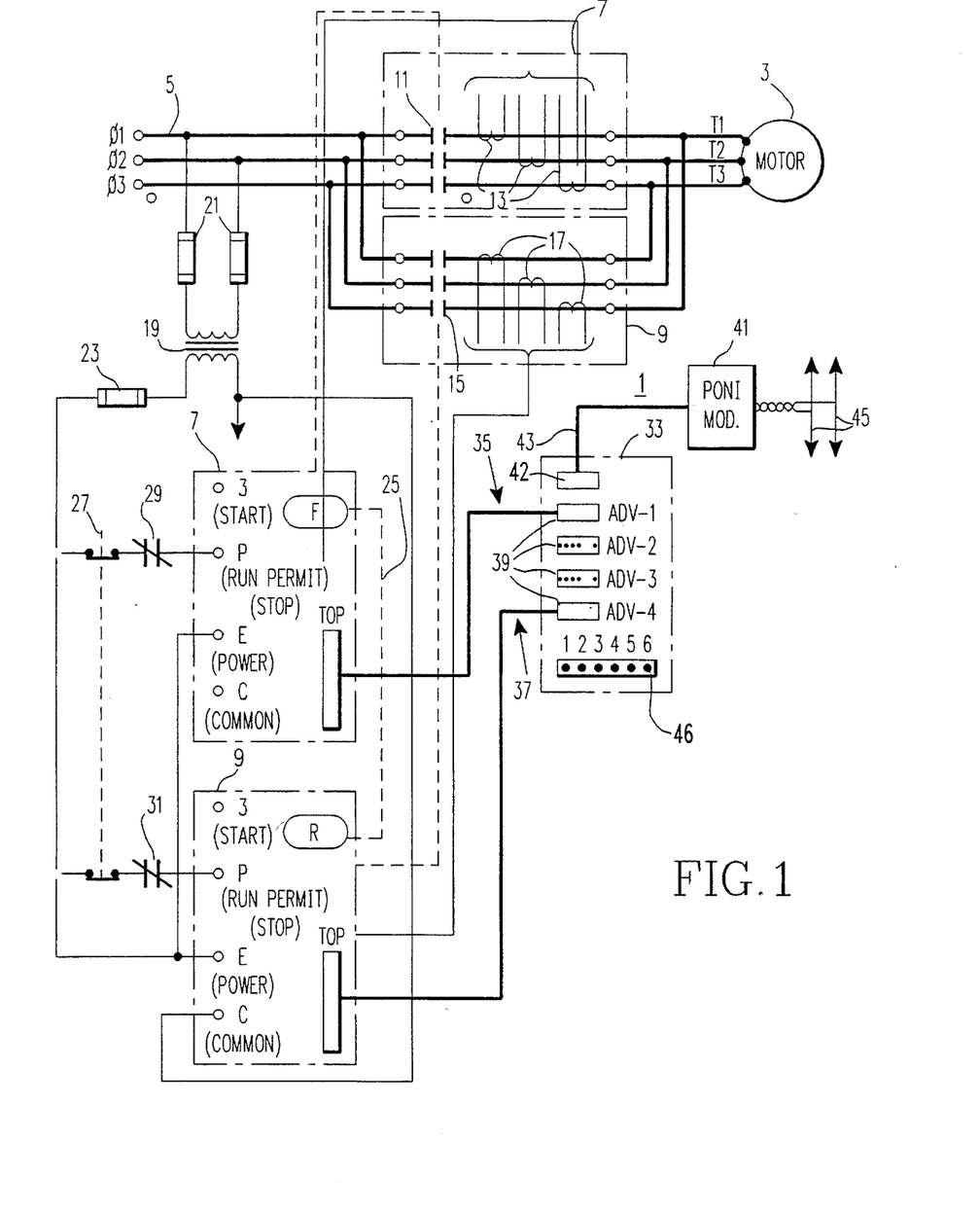
FIG. 1 is a schematic diagram of a full voltage reversing contactor system in accordance with the invention for controlling an electric motor.

FIG. 1 illustrates a modular electrical contactor control system 1 which is used to control energization of a motor 3 from a three-phase power line 5. The system 1 includes a forward contactor 7 and a reverse contactor 9. The forward contactor 7 has a set of contacts 11 which connect the phases of the three-phase power line 5 to the motor 3 to cause the motor to rotate in the forward direction. Current transformers (CTs) 13 monitor current applied to the motor through the contacts 11 for use by the overload function of the contactor 7.

Similarly, the reverse contactor 9 has a set of contacts 15 which connect the phases of the three-phase power line 5 to the motor 3 in the opposite phase rotation to rotate the motor 3 in the reverse direction. CTs 17 provide three-phase current information to the reverse contactor 9 for overload protection and monitoring purposes.

Power for the contactors 7 and 9 is drawn from the two phases of the power line 5 by transformer 19 protected by fuses 21. The contactors 7 and 9 are microprocessor based contactors. An example of such a contactor is disclosed in U.S. Pat. No. 4,893,102 which is hereby incorporated by reference. The secondary of the transformer 19 is also protected by a fuse 23. The secondary of the transformer 19 is connected to the E(Power) inputs and the C(Common) inputs of the contactors 7 and 9. A mechanical interlock 25 prevents closing the forward and reverse contactors at the same time. One side of the transformer 19 is also connected to the P(Run Permit) inputs of the contactors 7 and 9 through a MAINTAINED STOP button 27, and for the forward contactor, normally closed reverse contacts 29 actuated by the mechanical interlock 25 when the reverse contactor 9 is closed. Power is applied to the P input of the reverse controller 9 through the MAINTAINED STOP button 27 and the normally closed forward contacts 31 of the mechanical interlock 25.

The contactor control system 1 also includes a controller 33. In the exemplary embodiment of the invention, the controller 33 can control from 1 up to 4 contactors. It will be understood that if desired the controller 33 could control additional contactors; however, the typical applications do not require the control of more than 4 contactors. The controller 33 controls the contactors 7 and 9 through separate serial data links 35 and 37. Cabling for each data link is connected between the contactor, and 1 of 4 connectors 39 on the controller. The controller 33 can also communicate with other peripheral devices. An interface 41 is connected to a peripherals connector 42 on the controller 33 by a serial data link 43. In the exemplary embodiment of the invention, the interface 41 is a peripheral operated network interface (poni) which connects the controller 33 with other devices (not shown) via network 45. For further flexibility, additional inputs 46 are provided to the controller 33, for such additional devices as a programmable logic controller (PLC) (not shown).

Figure 2:
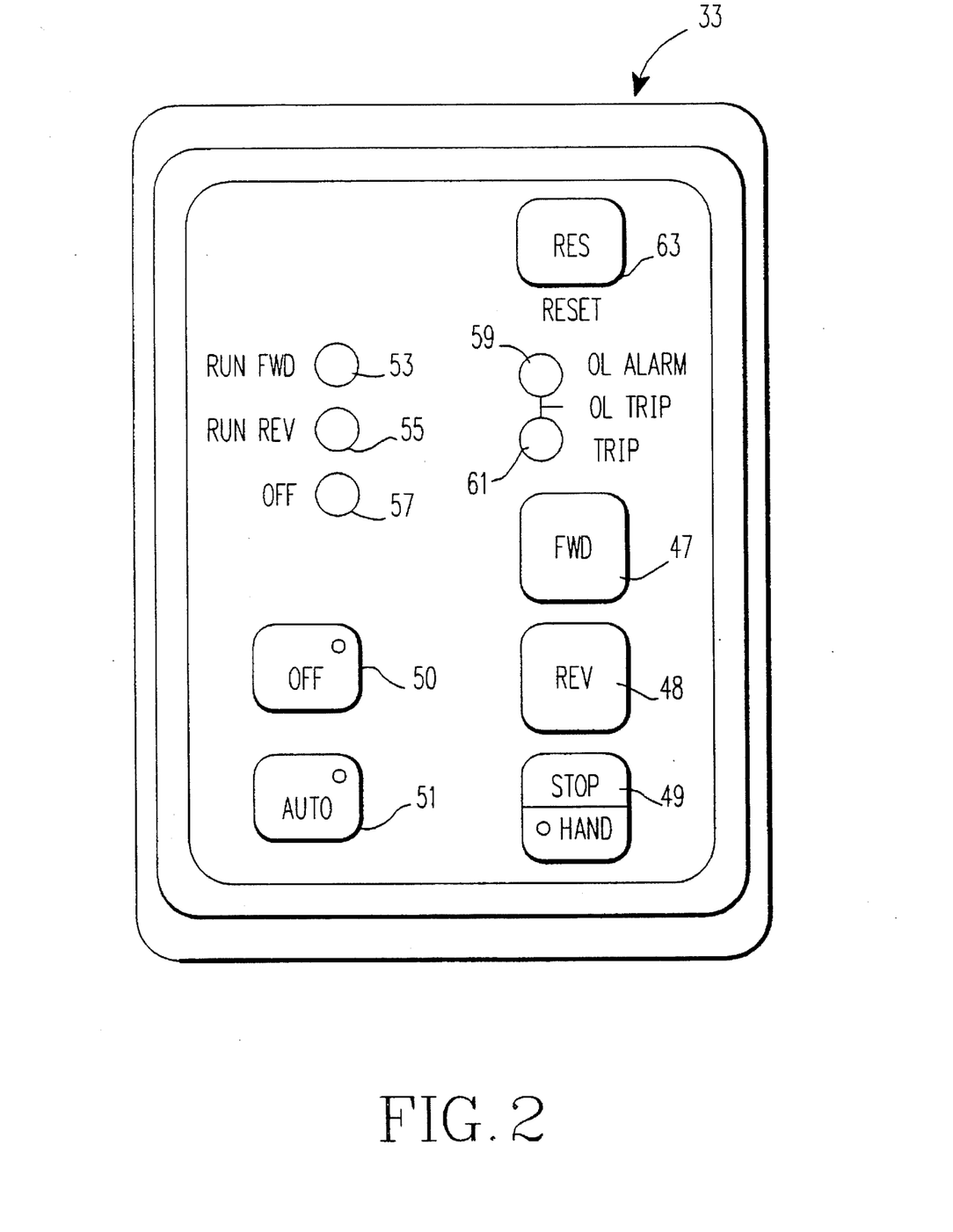
FIG. 2 is a front elevation view of a controller which forms part of the system of FIG. 1.

As one of its features, the controller 33 can serve as a push button station. Thus, as shown in FIG. 2, for the reversing motor starter system illustrated, the controller push button station can include a forward push button 47, a reverse push button 48, a stop/hand push button 49, an off button 50 and an auto button 51. The controller can also have a number of indicator lights such as a run forward light 53, a run reverse light 55 and an off light 57. Additional lights can be provided for the protection function, such as an overload alarm light 59 which indicates that the system will trip if appropriate action is not taken, and a trip light 61 which illuminates when the active contactor has tripped. In the exemplary system, illumination of both the overload alarm light 59 and trip light 61 indicate that the trip was on an overload. The off and auto buttons can also have indicator lights. The exemplary controller 33 also includes a reset button 63 which can be used to reset a tripped circuit breaker and also to test the lights. The push buttons 47–51 and 63 initiate functions in accordance with the conventions of the known push button stations.

Figure 3:
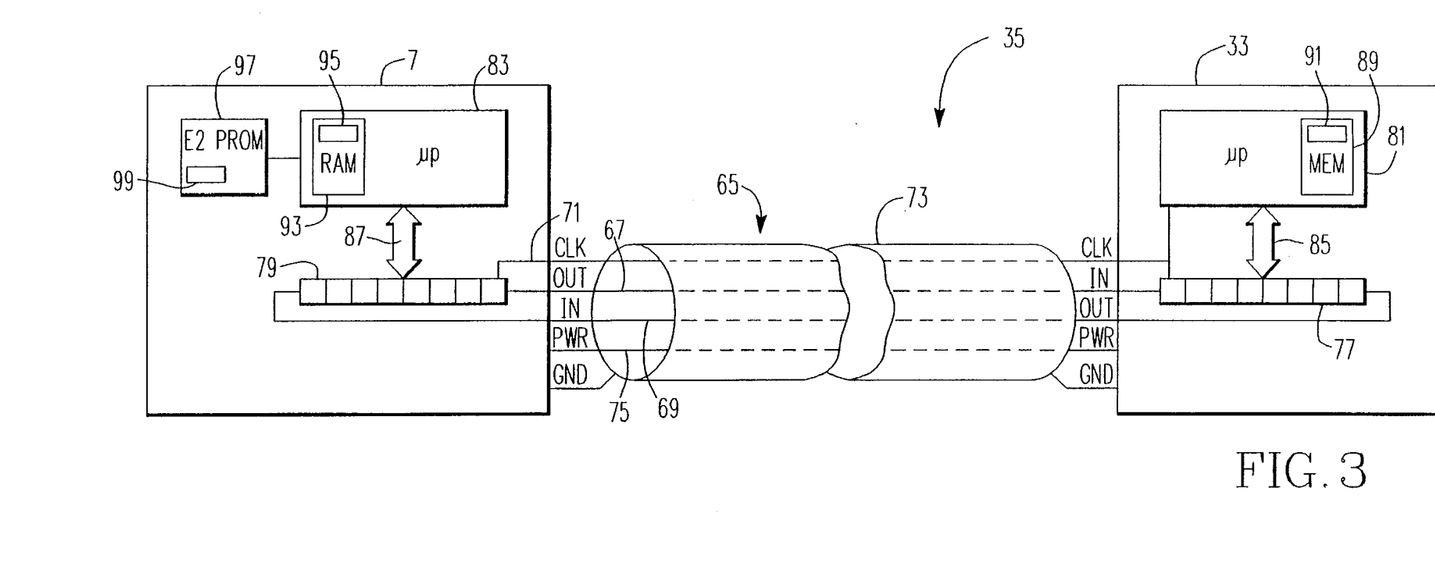
FIG. 3 is a schematic diagram illustrating the serial data link between the controller and one of the contactors of the system of FIGS. 1 and 2.

In contrast to the many leads operating at 120 volts required to connect the conventional push button station with each contactor, the serial data links 35 and 37 which interconnect the contactors and the controller 33 utilize a single cable 65 with only three wires carrying low level logic signals. As illustrated in FIG. 3, the serial data link 35 between the controller 33 and the forward contactor 7 includes two data lines 67 and 69 and a clock signal line 71. These three communication lines are protected from electromagnetic and radio frequency interference by grounded shielding 73. If desired, the controller 33 can be powered through the contactor over a power line 75. By providing the capability of drawing power from any one of the contactors, the reliability of the controller is improved.

The data link 35 includes an eight bit shift register 77 in the controller 33 and another eight bit shift register 79 in the contactor 7. The communication line 67 is connected to the output of the shift register 79 and the input of the shift register 77, while the communications line 69 is connected to the output of the shift register 77 and the input of the shift register 79. A microprocessor 81 in the controller 33 generates the clock signal, CLK, which clocks the shift register 77 and is sent over the CLK lead 71 to clock the shift register 79. The clocking of the shift registers 77 and 79 by the clock signal causes the shift registers to exchange their contents.

Microprocessors 81 in the controller and another microprocessor 83 in the contactor 7 can insert data into the respective shift registers and read the contents of the shift registers over parallel buses 85 and 87 respectively. The microprocessor 81 includes a memory 89 having a number of specified addresses such as 91. The microprocessor 83 includes random access memory, RAM, 93 having a number of addresses 95. The microprocessor 83 also has electronically erasable, programmable read only memory (E$^2$PROM) 97 also having various addresses 99.

Communications between the controller and the contactor is controlled by the controller 33. Thus, the controller is the master, and the contactor is the slave. A very simple protocol is used to reduce the overhead on the microprocessor 83 in the contactor. Each message comprises four successively exchanged bytes initiated by the controller. The first byte is a command. The commands for the exemplary reversing motor starter are as follows, expressed in hexadecimal:

00Hex=do nothing
33Hex=get byte from Slave
55Hex=Give Byte to Slave
99Hex=Close/Start Relay
77Hex=Trip Relay
BBHex=Reset Relay
EEHex=Program byte from corners into E2
EDHex=take byte from E2 and put to corners
39Hex=erase byte in the E2

The GET BYTE and GIVE BYTE commands are for getting data from, and sending data to, the RAM 93 in the microprocessor 83 of the contactor. The last three commands are for reprogramming, reading, and erasing bytes in the $E^2$PROM. The $E^2$PROM stores the software identification and various parameters used by the microprocessor 83, while the RAM stores data generated in operation of the contactor.

When the controller, the master, sends a command in the first byte of a message, the contactor, the slave sends back a "do nothing" code.

The second byte of each message initiated by the controller contains an address where appropriate. For instance, if the contactor is to send data or receive data in the RAM or is to reprogram, send data or erase a byte in the $E^2$PROM, the address of the byte is transmitted by the controller in the second byte of the message. If the command is to open or close the relay, and therefore is not associated with a location in memory, the "do nothing" command is transmitted as a second byte by the controller. The contactor transmits as the second byte, the command it received from the controller in the first byte of the message.

The third byte of each message is for data. If the controller is transmitting data to the contactor, it is sent in this third byte. On the other hand, if the command was for the contactor to send data to the controller, the "do nothing" command is transmitted by the controller as the third byte. If the controller is requesting data from the contactor, the contactor sends the data at the address specified by the second byte of the message, back to the controller as the third byte. If the command of the first byte does not relate to an address in contactor memory, the contactor merely sends back what it received from the controller in the second byte. Likewise, if the command had been to send data to the contactor, the contactor would return as the third byte, the address in which to place the data sent to it by the controller as a second byte.

The fourth byte of each message is a check sum. Various check sums schemes can be used. In the following examples, the check sums are the sum of the ones that appear in the first three bytes transmitted by the controller. Both the controller and the contactor calculate this check sum and transmit it to the other device. Thus, the check sum received should equal the check sum calculated and transmitted. Another example of a scheme for a check sum would be to merely numerically add the values of the first three messages transmitted by the controller.

The following is an example of the GET BYTE command illustrating the bytes sent by both the controller and the contactor for each of the four bytes of the message.

Example of the GET Byte command:
Master Sends:33H Slave Sends:00H
Master Sends:xxH Slave Sends:33H (xx=adrs. of req. byte)
Master Sends:00H Slave Sends:ddH (dr=requested data)
Master Sends:##Slave Sends:##H
=1's in 33H+1's in xxH+1's in 00H An example of the bytes transmitted by the controller and the contactor for the GIVE BYTE command are as follows:
Master Sends:55H Slave Sends:00H
1Master Sends:xxH Slave Sends:55H (xx=adrs. to place data)
Miaster Sends:ddH Slave Sends:xxH (dd=data to place)
Master Sends:##Slave Sends:##H
=1's in 55H+1's in xxH+1's in ddH An example of an operational command as opposed to a command to send or receive data is the CLOSE command:
Master Sends:99H Slave Sends:00H
Master Sends:00H Slave Sends:99H
Master Sends:00H Slave Sends:00H
Master Sends:##H Slave Sends:##H
=1's in 99H+1's in 00H+1's in 00H The controller 33 of the exemplary embodiment of the invention may be used in a reversing control system for a motor and also for a two-speed motor control. In the later case, the controller controls two motor starters one of which, for instance, controls a slow speed winding on the motor and the second of which controls a fast speed winding on the motor. The software of the exemplary controller generates control signals which are applied to the forward controller and the reversing motor control configuration and to the fast speed contactor in the two-speed installation, and generates other signals which are common to the reverse contactor and slow speed contactor in the two configurations. Thus, in the following discussion of the software where reference is made to the forward contactor, the controller would similarly generate a signal for the fast contactor in the two-speed configuration. Likewise, the functions performed with regard to the reverse contactor would be applied to the slow contactor in the two-speed configuration.

Figure 4:
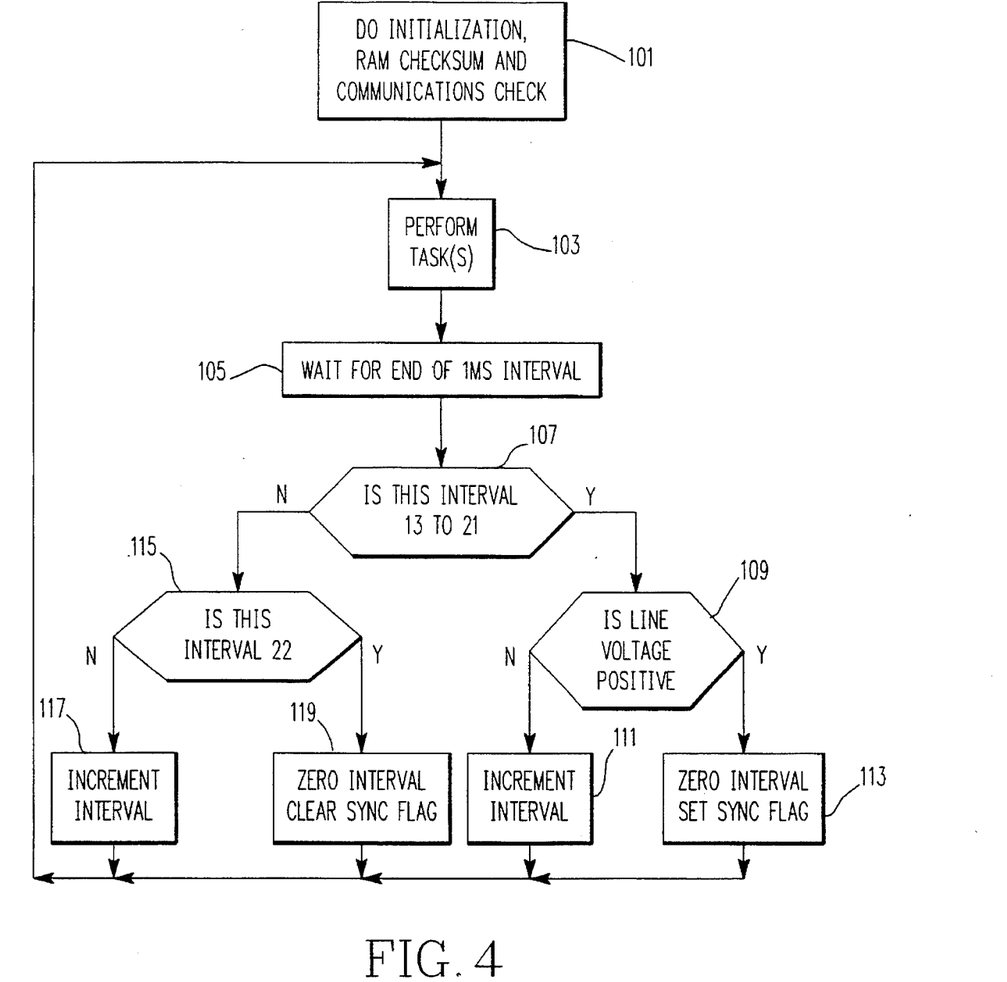
FIG. 4 is a flow chart for a suitable master computer program for the controller.

FIG. 4 illustrates a flow chart for the main loop for the reversing/two-speed controller 33. As indicated at 101, the controller does an initialization, a memory check, and a communications check upon start-up. It then enters a loop in which it performs various tasks as indicated at 103. At millisecond intervals the controller performs a number of tasks, with a different one or more of the tasks performed on each pass through the loop. These tasks include communications with the contactor 7 and 9 and the poni 41. In communications with the poni, the controller 33 is the slave and the poni 41 is the master. The same protocol described above for communications between the controller and the contactors is used. Additional tasks performed by the controller at 103 in FIG. 4, include reading the push buttons on the front of the controller, shown in FIG. 2, servicing the lights on the front panel, reading dip switches 46 mounted on the controller (see FIG. 1) for inputting configuration changes, and calling a control routine.

Another task performed at 103 is synchronizing the operation of the contactor to the ac power. In the exemplary controller there are intervals numbered zero through 22. The various task discussed above, except for synchronization, are performed in intervals zero through 12. Synchronization is performed during intervals 13 to 21 when a negative to positive zero crossing is detected. Interval 22 forces the loop to restart the interval sequence if synchronization is lost.

After waiting for the end of each one millisecond interval at 105, and if the synchronization task is being performed as determined at 107, the polarity of the line voltage is checked at 109. If the line voltage is negative, the interval is incremented at 111, and the program loops back to perform the next task. When the line voltage turns positive, as detected at 109 indicating that there has been a negative to positive zero crossing, the interval is reset to zero at 113 and a synchronization flag is set.

If it is determined at 107 that the synchronization task is not being performed, and the interval is not 22, as determined at 115, the interval is incremented at 117. If, however, interval 22 is reached, then the interval is set to zero and the synchronization flag is cleared at 119.

Figure 5:
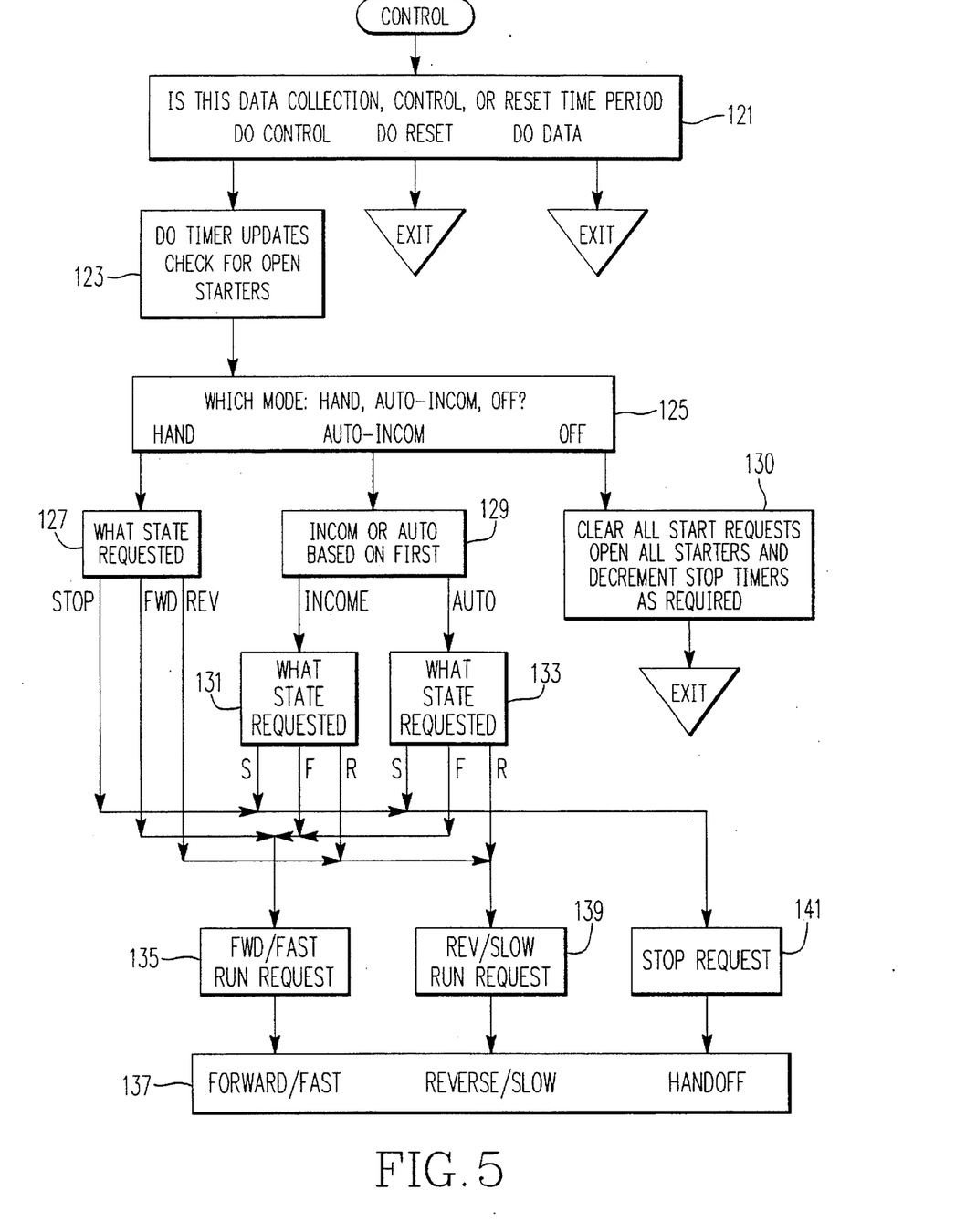
FIG. 5 is a flow chart of a suitable control program for the controller.

The flow chart for the control routine which is called by the main loop is illustrated in FIG. 5. The controller allocates specified time periods for data collection, control and reset functions. During the control period as determined at 121, the program updates the various functional timers. For instance, for the reversing motor controller, a mandatory stop can be required before the motor can be started in the opposite direction. A mandatory stop timer provides this capability. In addition, in the two-speed configuration, the operator can compel that if the motor is to be stopped while running at fast speed, that it must first stabilize at low speed. A compelled deceleration tinier provides this capability. For the reversing motor controller, them are two separate timers f and r for the forward and reverse contactor. All of these timers are updated at 123 and a check is made for open starters. A determination is then made at 125 as to which mode the controller is in. If it is in the hand mode, a determination is made at 127 as to what state is requested by the push buttons on the face of the controller. If the controller is in the auto or incom mode, indicating that it is under the control of a PLC or by a remote device on the network 45 through the poni 41, respectively, a determination as to which is made in 129. If the external commands are coming from the network through the poni, the requested state is determined at 131. While if the PLC is in control, the requested state is determined at 133.

If the controller is in the off mode, as determined at 125, all start requests are cleared, all starters are opened, and the stop timers are decremented as required. Each time the control routine is run, when in the off mode, the stop timers are decremented until they reach zero.

If the forward (in the reversing starter configuration, or fast in the two-speed configuration) is selected in any of the operating modes as determined at 135, then a forward/fast routine is selected at 137. If the slow or reverse states are requested as determined at 139, a reverse/slow routine is selected at 137. Finally, if the stop state is selected in any of the operating modes, as detected at 141, then the handoff routine is selected at 137.

Figure 6:
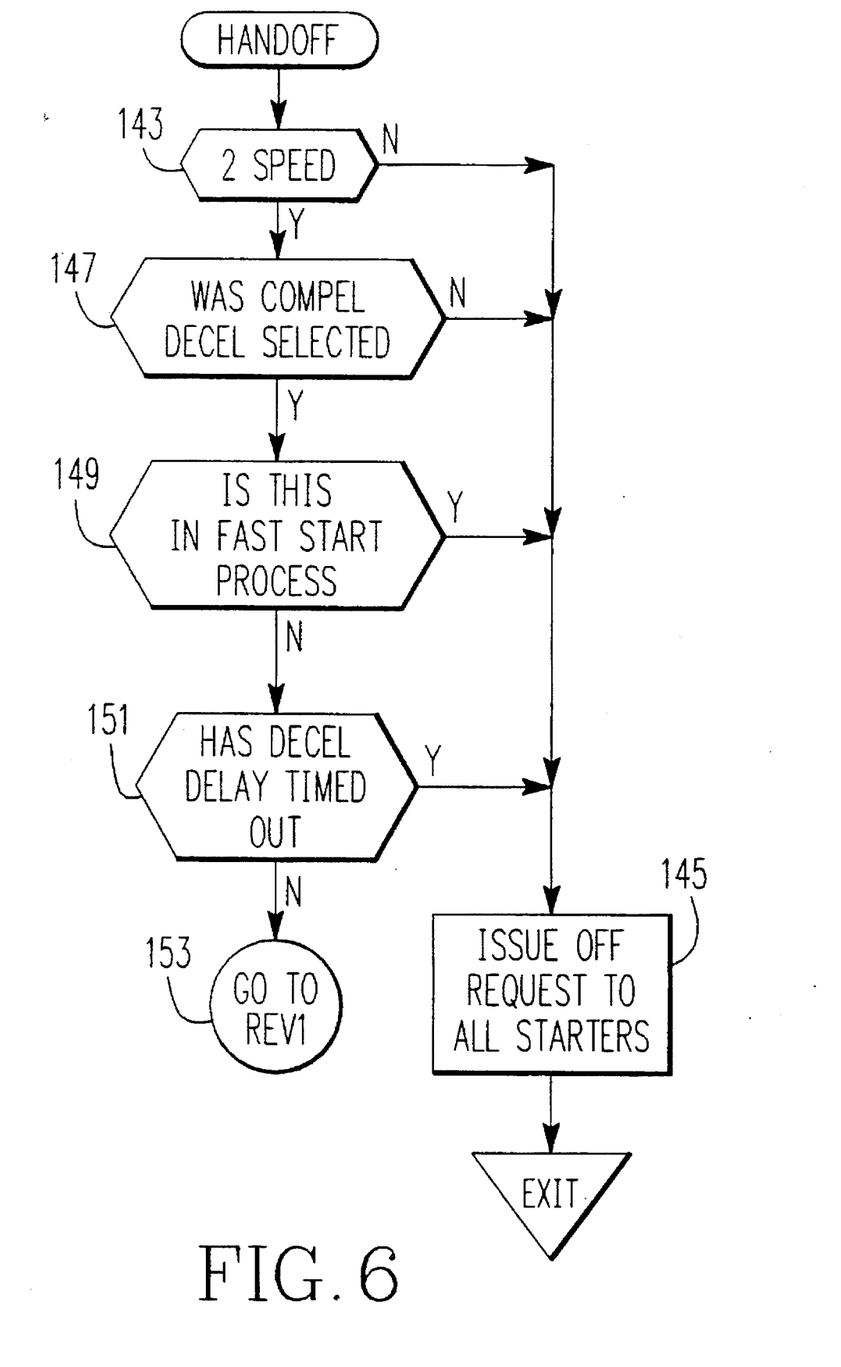
FIGS. 6–8 are flow charts for routines called by the control program.

FIG. 6 illustrates the handoff routine. If the system is in the reversing starter configuration, as determined 143, an off request is issued to all starters at 145. In the two speed configuration, a determination is made at 147 as to whether compelled deceleration has been selected. If it has not, or even if it has, but the system in the process of a command to start and run at fast speed, as determined at 149, the off request to all starters is generated at 145. If the compelled decelerate option has been selected, and the system is not in the process of starting to run fast, the deceleration delay timer is checked at 151. If this timer has timed out, indicating that the motor has been running at slow speed for sufficient time, then the motor is shut down. If the deceleration delay timer has not timed out at 151, which would occur for instance if the motor were running at high speed, the program transfers at 153 to the last half of the reverse (slow) routine illustrated at FIG. 7, and the forward or fast starter is ordered opened at 155. If the reverse or slow timer has not timed out as determined at 157, the routine is exited until the control program is called again at the next control interval. If the delay R has timed out, a check is made at 159 as to whether the reverse/slow contactor is dosed. If it is not, indicating that this is the first time through the routine since the tinier tinled out, the overcurrent tally is calculated in a manner to be discussed and transferred to the reverse/slow timer as indicated at 161. The reverse/closed starter is then closed at 163 and the closing is continued. The process flags are then cleared at 165 and the run and the direction of the ran, or speed of the run, flags are set at 165.

Figure 7:
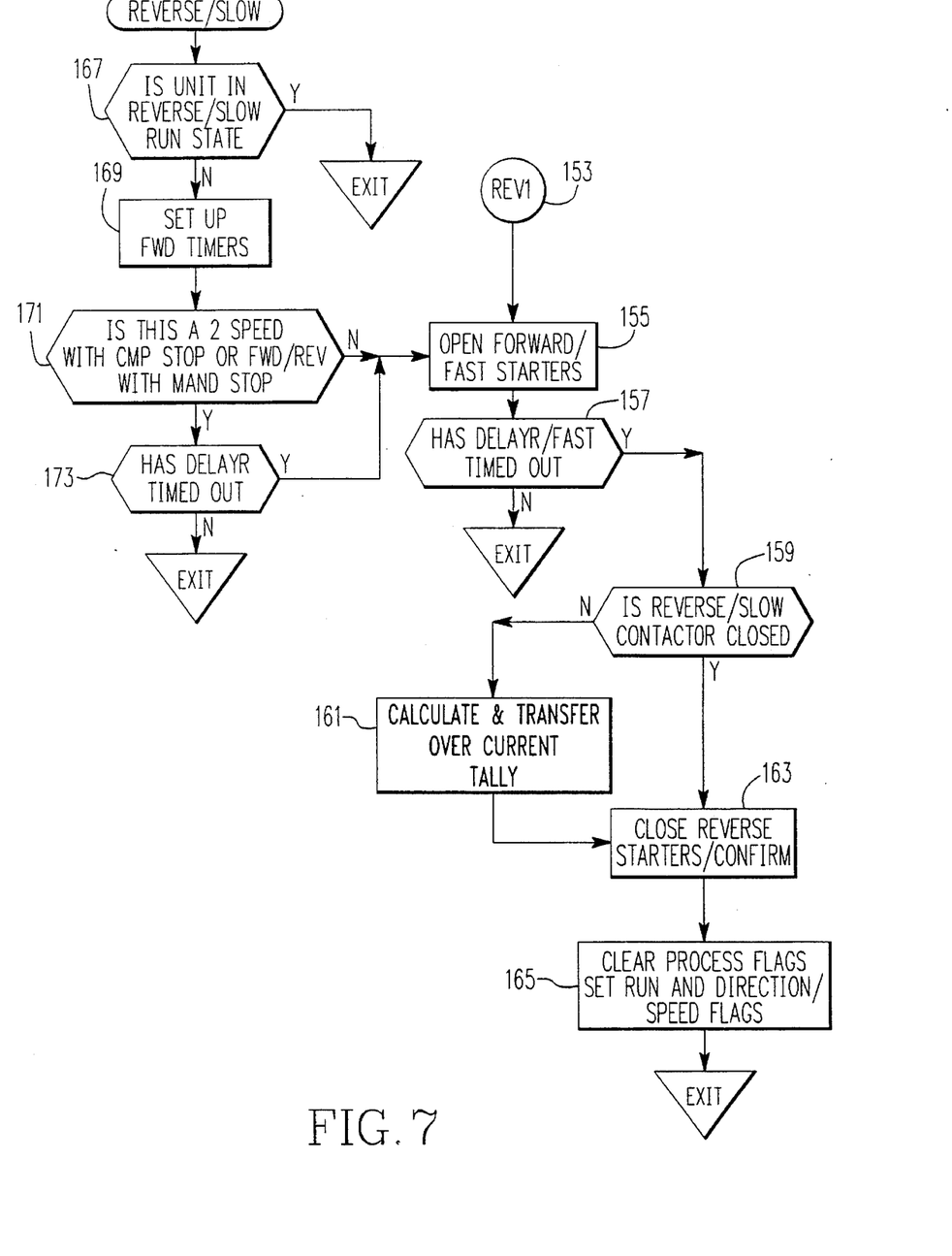

If a reverse/slow run request is detected by the control program, the reverse/slow routine of FIG. 7 is called. If the system is already in reverse/slow run state, as determined at 167, there is nothing to do. If not, the forward/fast timers are set in 169. If compel stop in a two-speed configuration or mandatory stop in the reversing configuration have not been selected as determined at 171, or they have been selected and the delay R has timed out as determined at 173, then the forward/fast starter is opened at 155, and the sequence continues as discussed above to calculate and transfer the overcurrent tally and close the reverse/slow starter.

Figure 8:
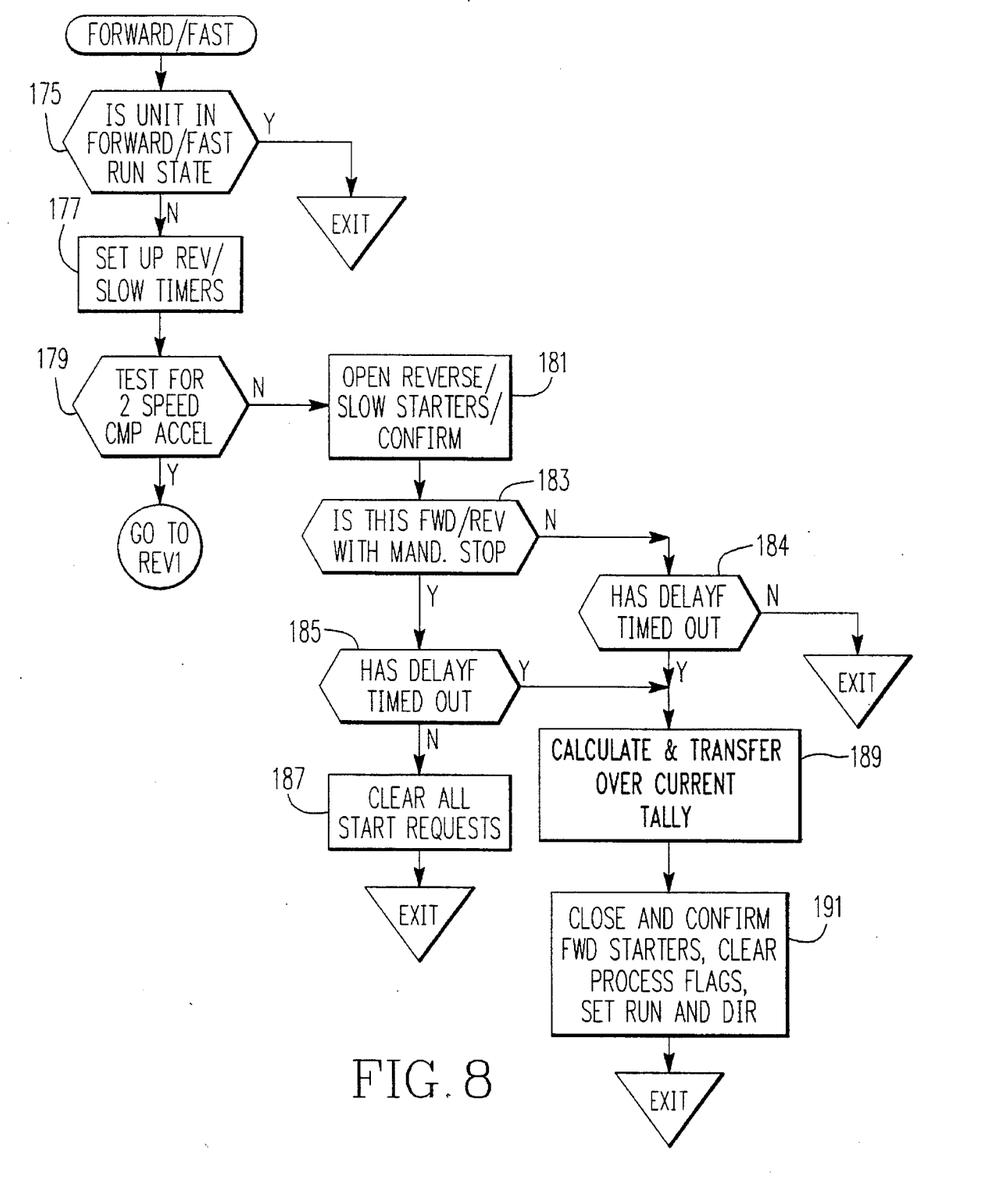

If the control routine detects a forward/fast run request, the forward/fast routine of FIG. 8 is called. If the unit is already in the forward/fast run state as determined at 175, then nothing need be done. If not, the reverse/slow timers are set up at 177. In the two speed configuration, a compelled acceleration option is available which requires that the motor go through slow speed operation for a specified time period before transferring to fast speed. Thus, a test is made at 179 in FIG. 8 to determine if this option has been selected. If it has not been selected or a specified period of slow speed operation has timed out, then the slow speed starter, or in the case of the reversing configuration, the reverse starter is opened and the opening is confirmed at 181. If the mandatory stop has been selected for the reversing configuration, as determined at 183, and the delay F which permits the motor to come to a stop and the reverse direction timer has not yet timed out as determined in 185, then all start requests are cleared in 187. This implements the strategy that with a mandatory stop, the request for the forward direction must be reinitiated after the motor has come to a stop. If the mandatory stop has not been selected or the system is in the two-speed configuration, the system waits for the delay F to time out at 189. When the delay F has timed out, the overcurrent tally is calculated and transferred from the reverse or slow starter to the forward or fast starter at 189. The forward/fast starters are then closed and continued closed. The process flags are cleared and the run and direction flags are set at 191.

Figure 9:
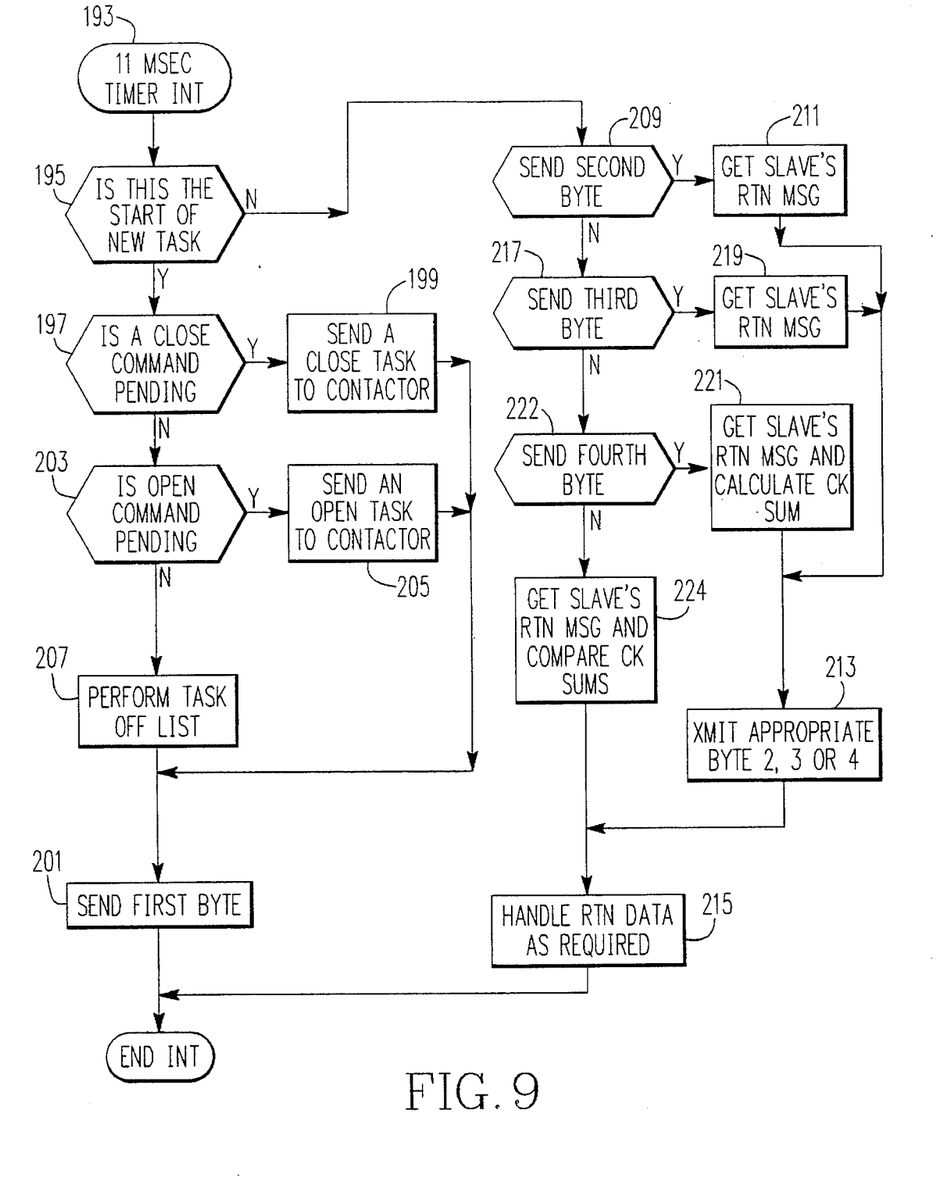
FIG. 9 is a flow chart for a suitable computer program for the controller for implementing message exchange.

FIG. 9 illustrates a flow chart of a routine which the controller uses to implement the four-byte message exchange with the contactors. This routine runs asynchronously to the master logic loop and may be initiated by a time interrupt such as every 11 milliseconds. In response to the interrupt at 193, a determination is made at 195 as to whether a new task is being initiated. If it is, a determination is made at 197 as to whether a close command has been generated by the control routine. If it has, the close command is loaded into the controller end of the serial data link at 199, and this first byte of the message is clocked to the contactor at 201. If no close command was detected at 197, but an open command was detected at 203, then the open command is sent to the serial data link at 205 and clocked to the contactor as the first byte at 201. If the task is neither a close command nor an open command, then one of the remaining commands from the list of commands discussed above is selected at 207 for transmission as the first byte at 201.

On the second execution of the routine as determined at 209, the return message sent by the contactor/slave is retrieved at 211 and the second byte appropriate for the command is transmitted at 213. The return data is then handled at 215 as required. As the contactor always returns as its second transmitted byte, the command sent by the controller on the first byte of the message, no processing of this data is required, although it could be used as a system check if desired.

On the third execution of the routine of FIG. 9, as determined at 217, the contactor/slave tatum message is obtained at 219. This will be the byte sent by the contactor/slave as the second byte of the contactor's message, and then the third byte is transmitted at 213. No processing of the second byte received from the contactor is required, as it will be recalled that this will merely be the return of the original command sent by the controller on the first byte, although it could be used as a system check.

On the fourth execution of the routine, the third byte transmitted by the contactor is obtained at 221 and the check sum is calculated for transmission as the fourth byte at 213. The handling of this third byte at 215 depends upon the command sent by the controller on the first byte. If the GET byte was sent, the contactor sends the requested data as its third byte. No action is taken at this point, however, until the check sum has been evaluated.

On the subsequent execution of the routine of FIG. 9, the fourth byte transmitted by the slave, which is the slaves check sum, is obtained at 221 and compared with the check sum calculated at 221. Assuming that the check sum obtained from the contactor agrees with that calculated by the controller, data obtained from the contactor can then be stored for use by the controller at 215. This use can include transmission to the other controller as in the case of the thermal image, transmission to the poni when requested, or for use by the controller in its control functions.

Figure 10:
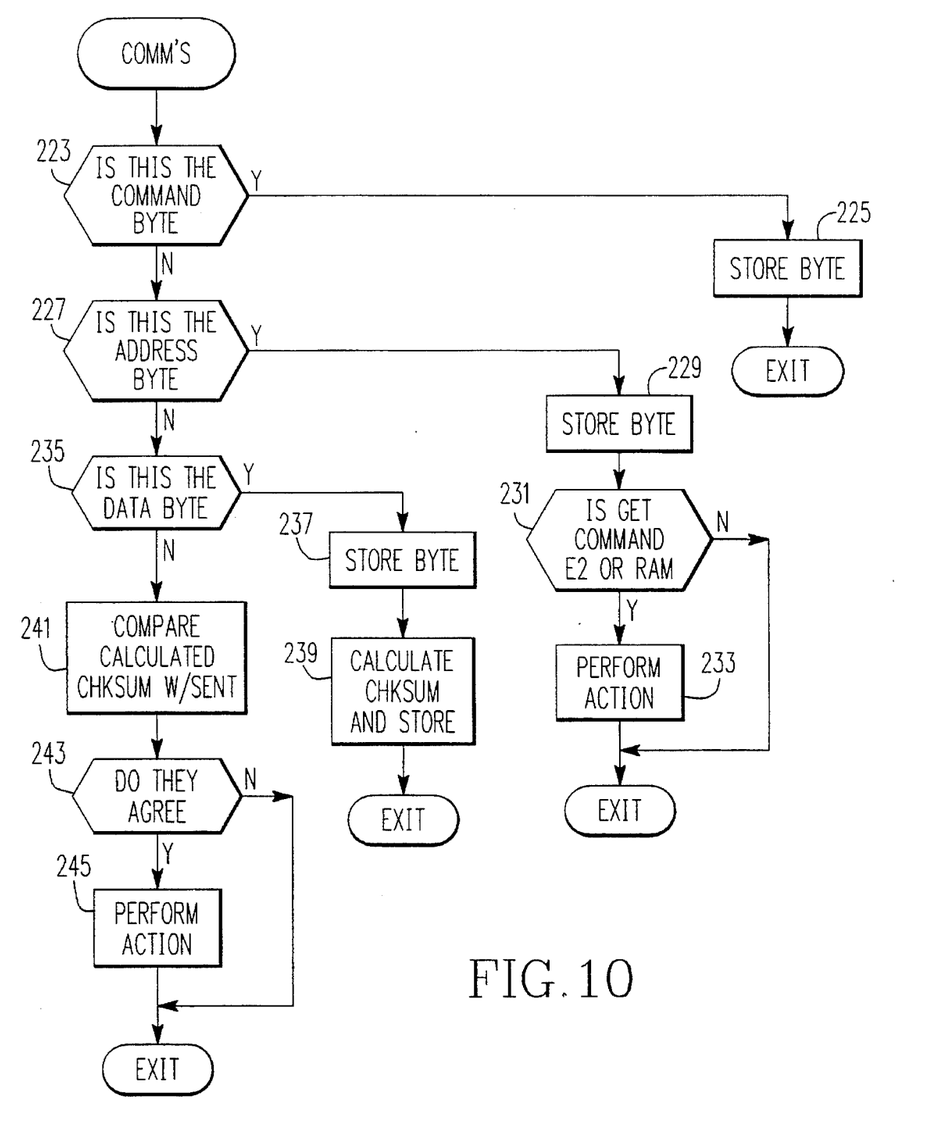
FIG. 10 is a flow chart for a suitable computer program for a contactor for implementing message exchange.

FIG. 10 illustrates the comm's routine which is called by the contactor after a byte has been received. If this byte is the command or first byte as determined at 223, it is stored at 225. If it is the second or address byte as determined at 227, it is stored at 229. If the command byte was to get data from either of the memories in the contactor, as determined at 231, the data at the address specified in the second byte is obtained at 233 for transmission to the controller as the third byte. When the third or data byte is received from the controller, as determined at 235, it is stored at 237 and used along with the bytes stored at 225 and 229 to calculate and store a check sum at 239.

When the fourth byte, which is the check sum, is received by the contactor as determined by a NO at 235, this check sum from the controller is compared at 241 with the check sum calculated at 239. If the two check sums agree, as determined at 243, then actions requiting confirmation are performed at 245. Actions that require confirmation would be, commands such as to open, close, trip or change data in its memories. No confirmation was required for transmitting data from the contactor's memory at 233, because this action had no effect on the operation of the contactor.

As noted from FIG. 10, the contactor/slave does not have to generate any instructions to transmit a message. The transfer is controlled by the controller which effectuates a swap of the data stored in the data link shift registers of the controller and the contactor/slave. While this protocol is in some respects inefficient, in that four bytes must be successively transmitted to effectuate the exchange, the very simple structure of the protocol places very little burden on the contactor. It does however require that specific addresses be dedicated in each of the contactors for particular data. One such address in the contactor memory contains the contactor status which is repeatedly polled by the controller.

Figure 11:
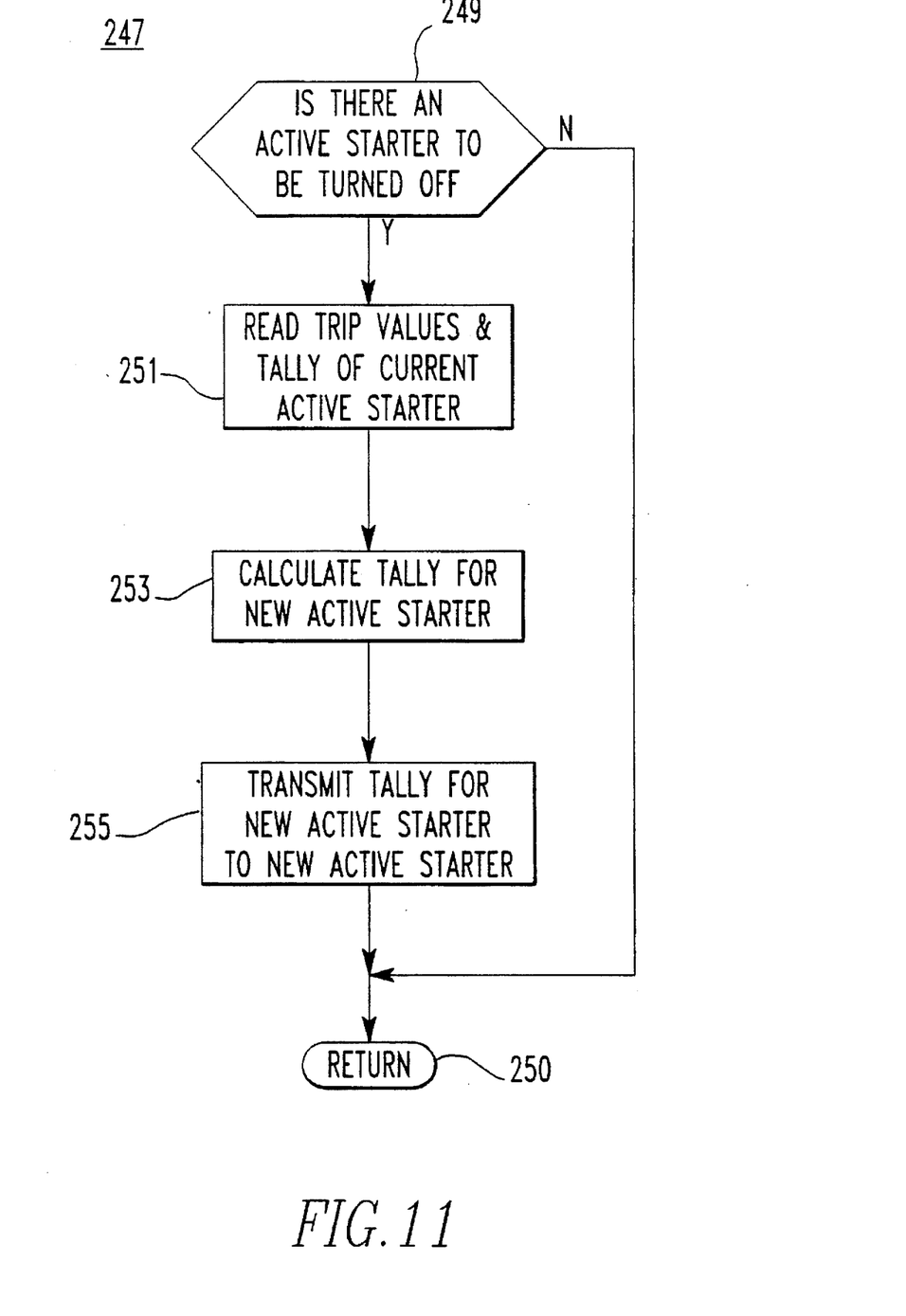
FIG. 11 is a flow chart for a suitable computer program for scaling and transferring overload information between contactors in accordance with the invention.

FIG. 11 is a flow chart for transferring scaled overload information between contactors. Each contactor 7,9 provides overcurrent protection. Overcurrents result in heating of the load and hence this type of protection is also referred to as thermal protection. Typically, an $I^2T$ function is used in microprocessor based contactors for overcurrent protection, although other current/time functions can be utilized. A digital tally of the overcurrent condition is maintained by the active contactor. To generate this overcurrent tally, the current is compared to a threshold value, typically the rated current for the load, and when the threshold value is exceeded, the tally, which in the exemplary case is the current squared per unit time, is accumulated. When the tally reaches a trip value, the contactor is opened. If the current drops below the threshold value before the trip value is reached, the tally is decremented to mimic cooling of the load. As has been noted, it is known to transfer the accumulated overload condition from a contactor which has been active to another contactor which becomes active as an initial value so that the new active contactor begins operation with the existing thermal condition of the load. This presumes, however, that current/time protection characteristic for operation with the two contactors is the same. This is not always so, particularly in the case of a multi-speed application, but it can also be true for a reversing motor control.

The present invention provides accommodation for different trip conditions in a multiple contactor installation. In accordance with the invention, the thermal image or overcurrent tally, is scaled before being passed to the new active contactor. In the exemplary embodiment, the percentage that the overcurrent tally of the former active contactor represents of the trip level for that contactor is determined. The overcurrent condition or thermal image transferred to the new active contactor as the initial value is calculated as the same percentage of the trip level of the new active contactor. Thus, if the overcurrent tally of the former active contactor at the time of the transfer or is 50% of the trip level of that contactor, the initial value of the overcurrent tally for the new active contactor is set at 50% of the trip level of the new active contactor.

As shown in FIG. 11, the routine 247 for transferring overload information first determines at 249 whether there is an active starter which is to be turned off. If not, the program returns to the calling routine at 250. When there is an active starter to be turned off, the trip values for the starter to be turned off and the new active starter are read at 251 along with the tally of the current active starter. The overcurrent tally for the new active starter is then calculated at 253 as the same percentage of the trip value for the new active starter as the accumulated overcurrent tally for the starter to be turned off was of the trip value for that starter. This scaled overcurrent tally for the new active starter is then transmitted by the controller to the new active starter at 255 for use as the initial value of the overcurrent tally maintained by the new active starter. The program then returns to the calling routine at 250.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A contactor system for controlling energization of an electrical load; said system comprising;

first contactor means having a first current rating supplying energization to said electrical load when closed and having first processor means generating a first overcurrent tally as a function of current and time during which current supplied to said electrical load through said first contactor means exceeds said first current rating and tripping said first contactor open when said first overcurrent tally reaches a first trip value;

second contactor means having a second current rating supplying energization to said electrical load when closed and having second processor means generating a second overcurrent tally as a function of current and time during which current supplied to said electrical load through said second contactor means exceeds said second overcurrent tally and tripping said second contactor open when said second overcurrent tally reaches a second trip value; and controller means connected to said first and second processor means of said first and second contactor means controlling opening and closing of said first and second contactor means and having third processor means which, when one of the contactors means which has been closed is to be opened and the other contactor means which has been open is to be closed, calculates from the overcurrent tally from the one contactor which has been closed and the first and second trip values, and provides to the processor means of the other contactor means, an initial value for the overcurrent tally of the other contactor means when closed.

2. A contactor system for controlling energization of an electrical load; said system comprising;

first contactor means having a first current rating supplying energization to said electrical load when closed and having first processor means generating a first overcurrent tally as a function of current and time during which current supplied to said electrical load through said first contactor means exceeds said first current rating and tripping said first contactor open when said first overcurrent tally reaches a first trip value;

second contactor means having a second current rating supplying energization to said electrical load when closed and having second processor means generating a second overcurrent tally as a function of current and time during which current supplied to said electrical load through said second contactor means exceeds said second overcurrent tally and tripping said second contactor open when said second overcurrent tally reaches a second trip value;

controller means connected to said first and second processor means of said first and second contactor means controlling opening and closing of said first and second contactor means and driving third processor means which, when one of the contactor means which has been closed is to be opened and the other contactor means which has been opened is to be closed, calculates from the overcurrent tally from the one contactor which has been closed and the first and second trip values, and provides to the processor means of the other contactor means, an initial value for the overcurrent tally of the other contactor means when closed; and said controller means includes means calculating said initial overcurrent tally for said other contactor means as the ratio of the overcurrent tally value of said one contactor means to the trip value of the one contactor means multiplied by the trip value of the other contactor means.

3. The contactor system of claim 2 wherein the first and second processor means include means generating said first and second overcurrent tallies respectively as an integral with respect to time of the square of the current supplied to said electrical load.

* * * * *